United States Patent [19]

Scheuneman et al.

[11] Patent Number: 4,727,510
[45] Date of Patent: Feb. 23, 1988

[54] SYSTEM FOR ADDRESSING A MULTIBANK MEMORY SYSTEM

[75] Inventors: James H. Scheuneman, St. Paul; John R. Trost, Coon Rapids, both of Minn.

[73] Assignee: Unisys Corporation, New York, N.Y.

[21] Appl. No.: 737,635

[22] Filed: May 24, 1985

[51] Int. Cl.$^4$ ............................................. G06F 12/10
[52] U.S. Cl. ................................................... 364/900
[58] Field of Search ... 364/200 MS File, 900 MS File, 364/728

[56] References Cited

U.S. PATENT DOCUMENTS

| | | | |
|---|---|---|---|
| 4,189,767 | 2/1980 | Ahuja | 364/200 |
| 4,346,438 | 8/1982 | Potash et al. | 364/200 |
| 4,598,362 | 7/1986 | Kinzo et al. | 364/200 |

Primary Examiner—Archie E. Williams, Jr.
Assistant Examiner—Emily Y. Chan
Attorney, Agent, or Firm—Charles A. Johnson; Lawrence J. Marhoefer

[57] ABSTRACT

The preferred embodiment shown involves forming the memory system of B memory banks, where B is preferably a prime number, but may be a nonbinary number, i.e., $B=2^X$, where X is a positive integer, and where the requested address$=(Q+R)B$. The address translation system for each requestor seeking access to the memory system includes a ROM and an adder. The ROM is comprised of two ROMs, Q ROMa and Q ROMb. ROMb stores in successive memory locations a first portion Qb of the memory system address and Q ROMa stores in successive memory locatins a second portion Qa of the memory system address. An adder sums the data, Qa+Qb, stored in the addressed memory locations of Q ROMa and Q ROMb while Q ROMa stores in successive memory locations a Bank R portion that specifies the one of the B banks in which the sum Qa+Qb addresses the selected memory address in the selected memory bank of the memory system.

11 Claims, 4 Drawing Figures

Fig. 1b

SYSTEM FOR ADDRESSING A MULTIBANK MEMORY SYSTEM

BACKGROUND OF THE INVENTION

1. Field of the Invention

The present invention relates to the field of stored program, electronic digital computer memory systems and in particular to a system for the addressing of multibank memory systems.

2. Description of the Prior Art

In the prior art, it is known that digital computer systems incorporate very large capacity main memory systems that are comprised of a plurality of memory banks. Each memory bank is generally identical to every other memory bank in the memory system in operating speed and capacity, i.e., each bank incorporates the same number of addressable memory locations, each addressable memory location being capable of storing the same number of binary digits, or bits.

In prior art computer systems, it is generally the practice that data, i.e., the number of binary digits that make up the multi-bit words that are stored at each addressable memory location of the memory system, is transferred into or out of the associated memory system in successive memory requests from successive addressable memory locations. However, with the advent of the state of the art scientific processors that perform successive memory requests at very high addressing rates, e.g., once every 30 nanoseconds (ns), it has been found that the addressing rate or memory request frequency, of the scientific processor is now several times faster than the access rate, or cycle time, of the memory system. That is, a scientific processor may be capable of coupling successive addresses to an associated memory system every 30 ns while the associated memory system may not be capable of reading the data words out of the addressed memory locations at a rate greater than every, i.e., having a memory access time of, 240 ns.

In the prior art it is known to form a memory system of B memory banks, where $B = 2^X$, where X is a positive integer. This is so, as the digital computer system operates in the binary number system wherein translation of the number B to a specific memory bank number is logically optimal while yet utilizing the full range of the number of bits that represent the number B. That is, in a memory system having 8 ($8 = 2^3$) memory banks, the binary representation of each of the 8 memory banks is: memory bank 0 is represented by the binary number 000; memory bank 7 is represented by the binary number 111.

In such state of the art digital computer systems incorporating scientific processors, it has been the practice to utilize an addressing scheme whereby successive memory locations in the memory system are spread across the B = 8 memory banks. That is, in a memory system in which B = 8, data word 0 would be stored in memory location 0 of memory bank 0, data word 1 would be stored in memory location 0 of memory bank 1, etc., until data word 7 would be stored in memory location 0 of memory bank 7 after which the sequence would repeat and data word 8 would be stored in memory location 1 of memory bank 0, data word 9 would be stored in memory location 1 of memory bank 1, etc. until data word 16 would be stored in memory location 1 of memory bank 7, etc. Such a state of the art digital computer system is disclosed in the copending patent application ERA-3022 of James H. Scheuneman entitled High Performance Storage Unit having a filing data of Mar. 30, 1984, and a Ser. No. of 596,130 which patent application is assigned to the Sperry Corporation as is the present patent application, the teachings of which copending patent application are incorporated herein by reference.

Because, as discussed herein above, such state of the art scientific processors have address cycle times that are as short as, e.g., 30 ns and that are several times shorter than the memory cycle time, e.g., 240 ns, of the associated memory system, it is statistically quite possible that the scientific processor may attempt to address a memory location in a memory bank that the scientific processor has addressed within a previously initiated memory cycle time of, e.g., 240 ns. If such an attempt is made, a "memory stacking condition" occurs for which the scientific processor would be placed in a "waiting condition" until the previous memory cycle has been completed. This waiting condition provides a serious degradation of scientific processor performance. It is an object of the present invention to provide a novel system for addressing a multibank memory system whereby such performance degradation is minimized.

In such state of the art computer systems, the scientific processor operates under the control of computer programs that address the associated memory system in sequences of successive memory addresses that are incremented by a fixed number that is a power of 2, e.g., 4, as in successive memory addresses 0, 3, 7, 11, etc. This incrementation of, or separation between, successive memory addresses is called the "stride" of the computer program, and, although it is fixed for each computer program, different computer programs may have different strides.

SUMMARY OF THE INVENTION

In the present invention, knowledge of the strides of the computer programs that are employed by the computer system is utilized whereby the number B of the memory banks in the associated memory system is selected to be a prime number or a number that is not a power of 2, i.e., $B \neq 2^X$. Establishing this relationship ensures, with a high degree of probability, that the scientific processor will not address the same or a different memory location in the same memory bank during a memory cycle. That is, because memory addresses are translated as binary numbers and because the number B of memory banks in the memory system is not a binary number, e.g., is a prime number, it is highly unlikely that a stride which is a power of 2, i.e., $S = 2^Y$ where Y is a positive integer, will address the same memory bank twice within a memory cycle time.

In the addressing scheme of the present invention, because the number B of memory banks in the memory system is preferably a prime number, the binary representation of the address is in two parts, one part that represents the address of the memory location in a memory bank, as a power of 2, e.g., 128, while the second part, which represents the number of the memory bank in which the addressed memory location is resident, is not a power of 2 but a number to the base B. If B is selected to be a suitable number, such as a prime number, e.g., 3, 5, 7, 11, 13, 17, etc., the probability of a memory stacking condition occurring because of memory requests to a memory bank that has been previously addressed during a memory cycle is substantially precluded.

The addressing scheme of the present invention involves the organization of a read only memory (ROM) to address a multibank memory system that is comprised of a prime or nonbinary number of memory banks for the purpose of minimizing the probability of a memory stacking condition. The scheme is to form the memory system of B memory banks such that the statistical probability of the stride(s) of the scientific processor being equal to or a multiple or factor of B is remote. The greatest statistical probability of a stride not equaling or not being a factor of B would be when B is a prime number.

In one embodiment of the present invention, the memory system is comprised of a prime number B of memory banks whereby the stride(s) of the associated computer system's computer programs is not equal to B. This substantially precludes the probability of an excessive memory stacking condition. The addressing scheme employs, for each requestor for memory access, a ROM that is divided into two portions: one portion stores successive memory location addresses that are available in all of the B memory banks, which memory location addresses are represented as a binary number Q, the Quotient of the equation $$\frac{\text{Requested Address}}{B} = Q + R$$

and a second portion stores the remainder R of the equation and which remainder represents the number of the addressed one of the B memory banks. The ROM is addressed by the requestor, which ROM performs the arithmetic process noted in the above equation, providing, as outputs, the quotient Q and the remainder R. The remainder R selects the one requested memory bank of the B memory banks while the quotient Q selects the one requested memory location in the one requested memory bank.

In a preferred embodiment of the present invention, the ROM is comprised of two ROM'S. A first ROM, ROMb, stores in successive address locations a first portion Qb of the memory location address while a second ROM, ROMa, stores in successive memory locations a second portion Qa of the memory location address and a remainder R. For each requester memory address coupled to the ROM, there are read out Qb, Qa, and R. The quantities Qb and Qa are then coupled to an adder that adds the two quotients Qb plus Qa generating a sum that represents the address of the memory location in the one selected memory bank B.

This "splitting" of the ROM into two or more ROM's significantly reduces the total number of bits that are required to perform a given memory address translation. By selecting appropriate bit, or data word, lengths for the memory locations in the individual ROMa and ROMb, substantial reductions in ROM size may be achieved while still accommodating a substantial memory address space, or number of memory addresses.

DESCRIPTION OF THE PREFERRED EMBODIMENTS

Figure 1:
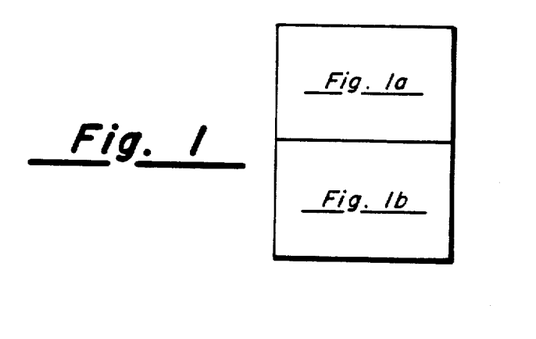
FIG. 1 includes FIGS. 1a and 1b, positioned as shown, and taken together they present an illustration of a block diagram of a system that incorporates the present invention for addressing a multibank memory system.
Figure 1A:
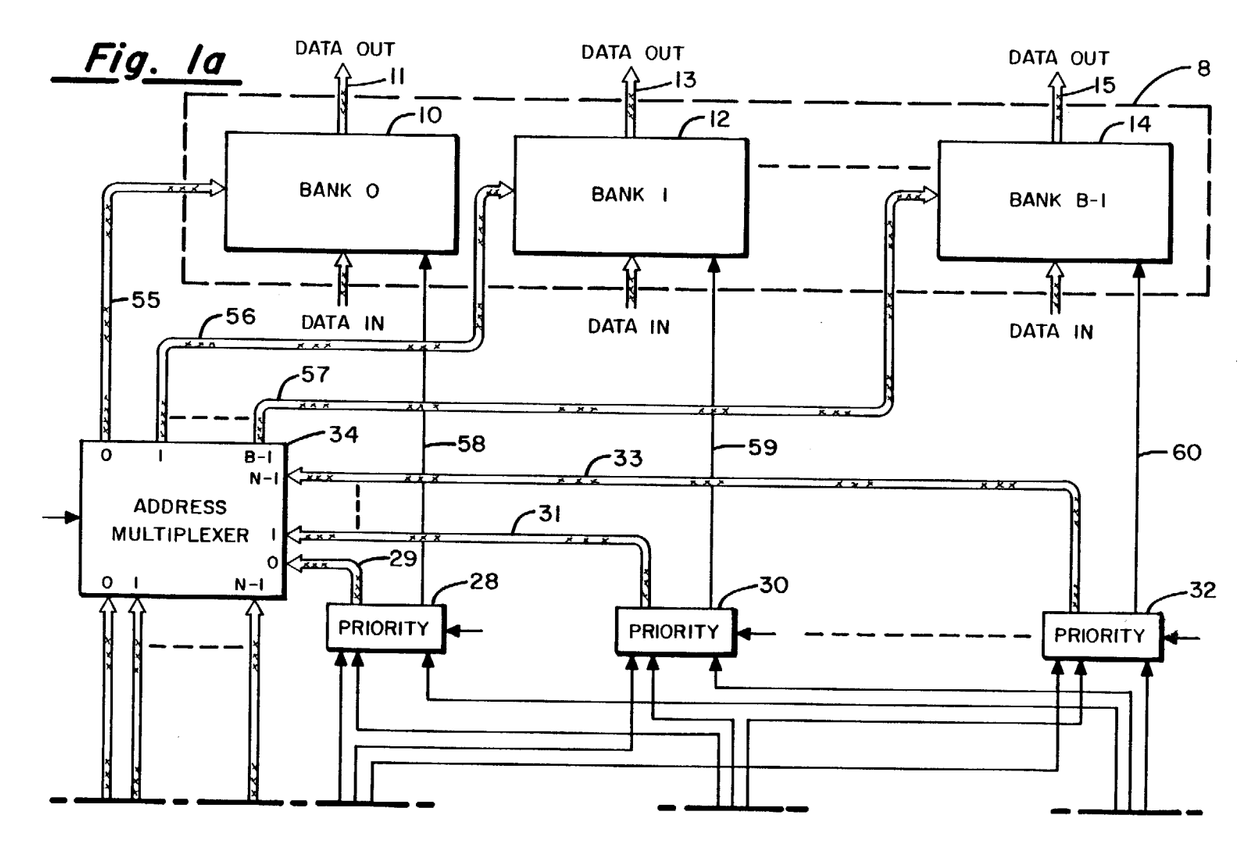
Figure 1B:
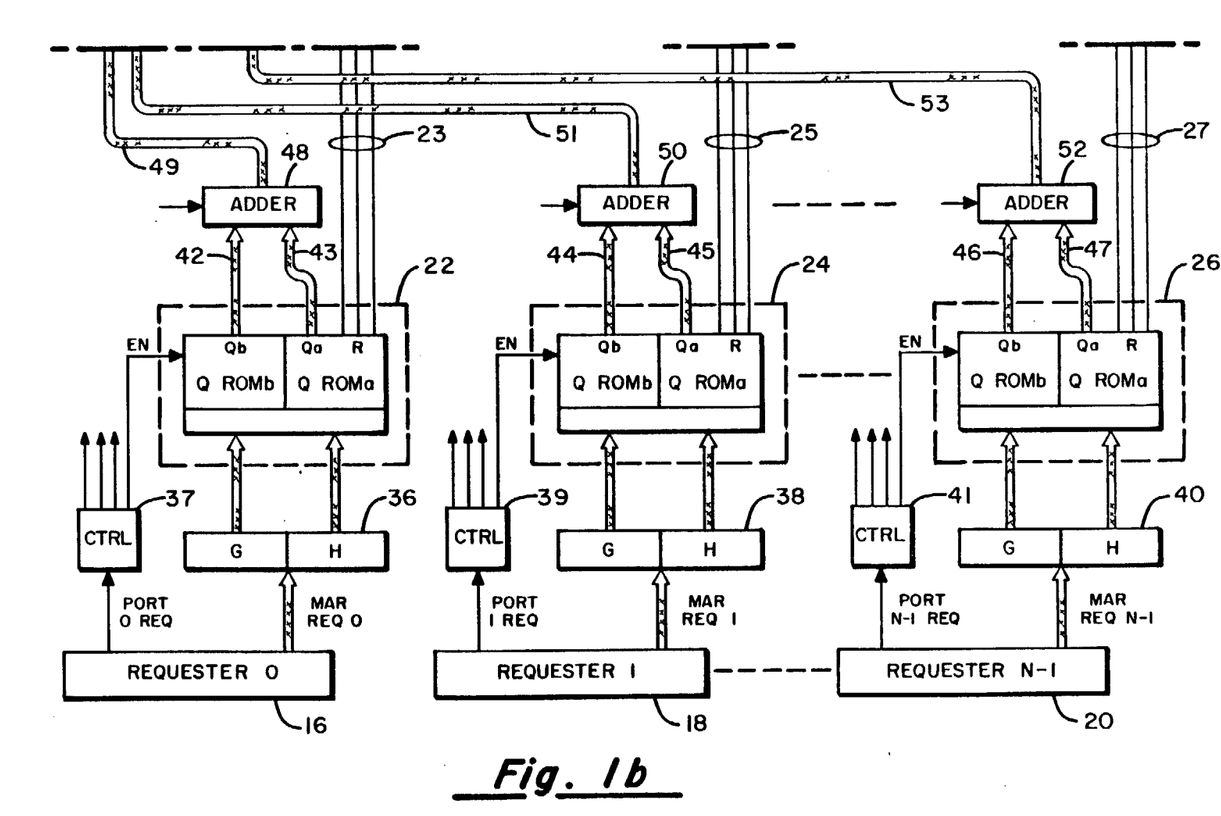
Figure 2:
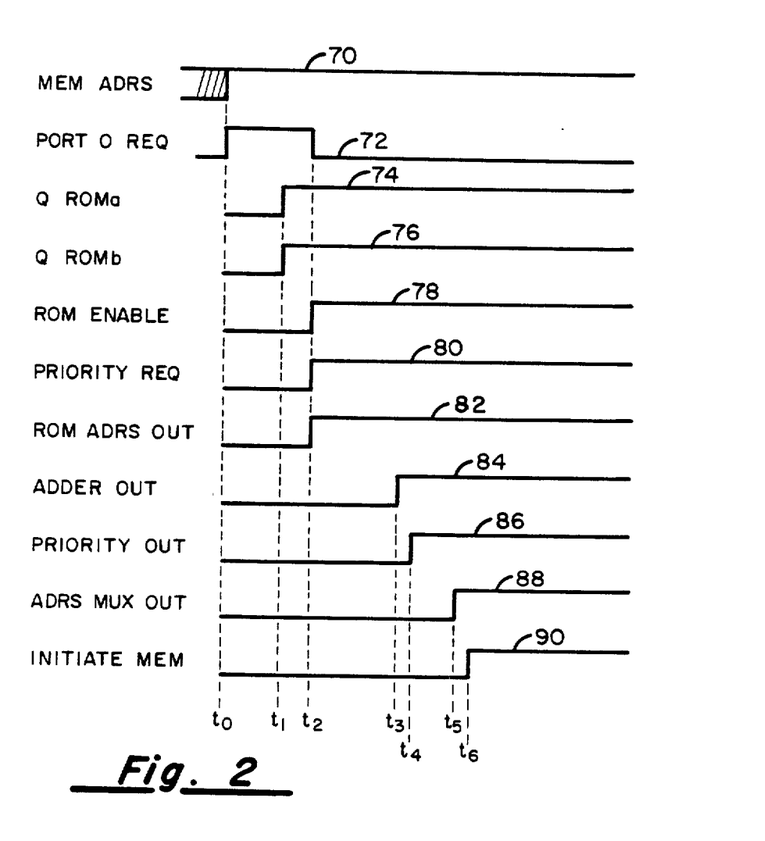
FIG. 2 is an illustration of a timing diagram associated with the block diagram of FIG. 1.

With particular reference to FIGS. 1 and 2, there are illustrated a block diagram of a system incorporating the present invention and a timing diagram associated therewith. In FIG. 1, it can be seen that there is illustrated a multibank memory system comprised of a plurality B of memory banks, memory banks 10, 12, 14, each of which has an associated priority network 28, 30, 32. Also illustrated are a plurality N of requestors 16, 18, 20, each of which has an associated address translation system, comprised of ROMs 22, 24, 26, each of which has an associated adder network 48, 50, 52. Each of the plurality of requestors 16, 18, 20 couples an associated requestor memory address and an associated Port Request signal to the associated address translation system of whereby the associated address is, via an address multiplexer 34, coupled to the selected one of the memory banks 10, 12, 14.

To provide a more meaningful discussion of the embodiment of FIG. 1, there are presented in Table A and Table B two examples of memory systems having two different memory system configurations:

TABLE A

| 128 | Number of memory addresses |
|---|---|
| 3 | Number of memory banks |
| 44 | Number of memory locations in each memory bank |
| 4 | Number of memory locations in the memory banks that is not accessed |

TABLE B

| 128 | Number of memory addresses |
|---|---|
| 11 | Number of memory banks |
| 12 | Number of memory locations in each memory bank |
| 4 | Number of memory locations in the memory banks that is not accessed |

Using Table A as an example, it can be seen that the number of memory addresses that are coupled by each requestor to the memory system of FIG. 1 is 128. Thus, each successive address in the left hand column headed Requestor Address is comprised of seven bits, i.e., $2^7 = 128$. This establishes the capacity of the memory system to be 128 memory locations, or data words, that are spread or distributed over the B memory banks.

For efficiency in decoding the requested memory address, the 7-bit memory address of Table A headed Requestor address is broken down into two portions: a first portion G comprised of the two higher order bits and a second portion H comprised of the five lower order bits. The two higher order bits are incremented one bit every 32 increments of the five lower order bits and are utilized to divide the total number of memory addresses into four groups. As will be discussed below, each such division permits the use of a prime number B of memory banks while permitting a minimum number of inaccessible memory locations in the memory system. Further, because inspection of Table A indicates that for each of the four groups of memory locations in Q ROMb the stored data is identical within each group; Q ROMb may be comprised of only four memory locations each having the stored data of memory locations 0 (000000), 32 (001011), 64 (010110), and 96 (100001). This characteristic of the present invention is that in a memory address space of 2F, F may be broken down into two portions where $F=G+H$ and thus, Q ROMb would have G memory locations, each of the G memory location having the stored data equal to the stored data of the previous memory location in Q ROMb plus the stored data of the previous memory location in Q ROMa plus 1.

TABLE A

| REQUESTOR ADDRESS | | Q ROMb | Q ROMa | BANK R | BANK ADDRESS | |
|---|---|---|---|---|---|---|
| G | H | | | | | |
| 00 | 00000 | 000000 | 0000 | 001 | 000000 | |
| 00 | 00001 | 000000 | 0000 | 010 | 000000 | |
| 00 | 00010 | 000000 | 0000 | 100 | 000000 | |
| 00 | 00011 | 000000 | 0001 | 001 | 000001 | |
| — | — | — | — | — | — | GP 1 |
| 00 | 11100 | 000000 | 1001 | 010 | 001001 | |
| 00 | 11101 | 000000 | 1001 | 100 | 001001 | |
| 00 | 11110 | 000000 | 1010 | 001 | 001010 | |
| 00 | 11111 | 000000 | 1010 | 010 | 001010 | |
| | | | | 100 | | ← |
| 01 | 00000 | 001011 | 0000 | 001 | 001011 | |
| 01 | 00001 | 001011 | 0000 | 010 | 001011 | |
| 01 | 00010 | 001011 | 0000 | 100 | 001011 | |
| 01 | 00011 | 001011 | 0001 | 001 | 001100 | GP 2 |
| — | — | — | — | — | — | |
| 01 | 11110 | 001011 | 1010 | 001 | 010101 | |
| 01 | 11111 | 001011 | 1010 | 010 | 010101 | |
| | | | | 100 | | ← |
| 10 | 00000 | 010110 | 0000 | 001 | 010110 | |
| 10 | 00001 | 010110 | 0000 | 010 | 010110 | |
| — | — | — | — | — | — | GP 3 |
| 10 | 11110 | 010110 | 1010 | 001 | 100000 | |
| 10 | 11111 | 010110 | 1010 | 010 | 100000 | |
| | | | | 100 | | ← |
| 11 | 00000 | 100001 | 0000 | 001 | 100001 | |
| 11 | 00001 | 100001 | 0000 | 010 | 100001 | |
| — | — | — | — | — | — | GP 4 |
| 11 | 11110 | 100001 | 1010 | 100 | 101011 | |
| 11 | 11111 | 100001 | 1010 | 010 | 101011 | |
| | | | | 100 | | ← |

TABLE B

| REQUESTOR ADDRESS | | Q ROMb | Q ROMa | BANK R | BANK ADDRESS | |
|---|---|---|---|---|---|---|
| G | H | | | | | |
| 00 | 00000 | 000000 | 0000 | 0000000001 | 00000000 | |
| 00 | 00001 | 000000 | 0000 | 0000000010 | 00000000 | |
| 00 | 00010 | 000000 | 0000 | 0000000100 | 00000000 | |
| 00 | 00011 | 000000 | 0000 | 0000001000 | 00000000 | |
| — | — | — | — | — | — | |
| 00 | 01001 | 000000 | 0000 | 0100000000 | 00000000 | |
| 00 | 01010 | 000000 | 0000 | 1000000000 | 00000000 | |
| 00 | 01011 | 000000 | 0001 | 0000000001 | 00000001 | GP 1 |
| — | — | — | — | — | — | |
| 00 | 11101 | 000000 | 0010 | 0001000000 | 00000010 | |
| 00 | 11110 | 000000 | 0010 | 0010000000 | 00000010 | |
| 00 | 11111 | 000000 | 0010 | 0100000000 | 00000010 | |
| | | | | 1000000000 | | ← |
| 01 | 00000 | 000011 | 0000 | 0000000001 | 00000011 | |
| 01 | 00001 | 000011 | 0000 | 0000000010 | 00000011 | |
| — | — | — | — | — | — | GP 2 |
| 01 | 11110 | 000011 | 0010 | 0010000000 | 00000101 | |
| 01 | 11111 | 000011 | 0010 | 0100000000 | 00000101 | |
| | | | | 1000000000 | | ← |
| 10 | 00000 | 000110 | 0000 | 0000000001 | 00000110 | |
| 10 | 00001 | 000110 | 0000 | 0000000010 | 00000110 | |
| — | — | — | — | — | — | GP 3 |
| 10 | 11110 | 000110 | 0010 | 0010000000 | 00001000 | |
| 10 | 11111 | 000110 | 0010 | 0100000000 | 00001000 | |
| | | | | 1000000000 | | ← |
| 11 | 00000 | 001001 | 0000 | 0000000001 | 00001001 | |
| 11 | 00001 | 001001 | 0000 | 0000000010 | 00001001 | |
| — | — | — | — | — | — | GP 4 |
| 11 | 11110 | 001001 | 0010 | 0010000000 | 00001011 | |
| 11 | 11111 | 001001 | 0010 | 0100000000 | 00001011 | |

TABLE B-continued

| REQUESTOR ADDRESS | | Q | Q | | BANK |
|---|---|---|---|---|---|
| G | H | ROMb | ROMa | BANK R | ADDRESS |
| | | | | 10000000000 | ← |

The data or quantities, stored in Q ROMb plus the data stored in Q ROMa for a given memory address are constructed to provide the memory address, noted in the right hand column headed Bank Address, in the one selected memory bank B defined by the column headed Bank R. In the configuration of Table A, each memory location in Q ROMb is comprised of an address of 6 bits, each memory location in Q ROMa is comprised of an address portion of 4 bits and a Bank R portion of 3 bits. The table is constructed such that the quantity stored in Q ROMb plus the quantity stored in Q ROMa are equal to the memory address location in the bank that is denoted by the 1-bit in the quantity stored in memory bank B.

It can be seen in Table A (and Table B) that the quantity stored in the Bank R portion of Q ROMa are not powers of 2, i.e., $B \neq 2^X$, where X is a positive integer, but 2 to the base B wherein only one bit position in the R bits in the Bank R portion of Q ROMa is set to a 1., all other bits being set to a 0. Thus, it can be seen in FIG. 1 that each of the cables 23, 25, 27 from ROM's 22, 24, 26, respectively, that couple the B bits from the Bank R portion of Q ROMa comprise B lines, each of the B lines being coupled to a respectively associated one of the B priority networks 28, 30, 32. That is, the right most bit of the quantity in Bank R, being denoted as the least significant bit, is coupled to the priority network associated with the lowest order memory bank 0, memory bank 10, while the left most bit of the quantity in bank R, being denoted as the most significant bit, is coupled to the priority network associated with the highest order memory bank B−1, memory bank 14. Accordingly, it can be seen in in Table A that the quantities in the Bank R portion of Q ROMa cycle through the B (3) quantities, 001, 010, 100, 001, 010, 100, 001, etc.

While the quantities in the Bank R portion of Q ROMa cycle through the B bit combinations or groups of R bits, repeating every Bth cycle of the sequence, the address portion in Q ROMa is kept constant throughout each cycle of each group of B bits, but is incremented 1 bit count every Bth bit. This incrementing of the quantity in the address portion in Q ROMa every Bth count ensures that the sequence of successive requestor addresses will cycle through successive like-ordered memory locations in each of the B memory banks.

In accordance with this construction, the coding, or quantity, stored in the Q ROMb of the ROMs is kept constant through each group of 32, i.e., $2^5$, successive addresses, i.e., address 0 (0000000) through 31 (0011111), address 32 (0100000) through 63 (0111111), address 64 (1000000) through 95 (1011111), and address 96 (1100000) through 127 (1111111). However, the quantity in the last memory location of each group, i.e., memory locations 31, 63, 95, is incremented by 1 plus the quantity in the memory portion of the last memory location of the group in Q ROMa to form the new quantity that is then inserted in the first memory location of the next group in Q ROMb. Thus, memory location 31 (0011111) in Q ROMb stores is (000000) and in Q ROMa stores 1010 whereby Q ROMb in memory location 32 (001011) stores 1010.

$$\begin{array}{r}000000\\1010\\\underline{1}\\001011\end{array}$$

Because B, which is selected to be a prime number, is not efficiently manipulated in a binary number system, the coding scheme employed by the present invention is to encode the quantity B, which is stored in the Bank B portion of Q ROMa, to the base B wherein only 1 bit of the B bits is set to a 1. However, this encoding scheme, although very efficient as regarding encoding/decoding the hardware requirements, does require that certain memory locations are rendered inaccessible. These inaccessible memory locations are denoted in Table A (and Table B) by an arrow indicating the one (as in Table A and Table B) memory locations in memory bank B−1 that is inaccessible every $2^5$th successive requestor address, i.e., in Table A (and in Table B) where the requestor address is 7 bits in length, the requestor addresses of the 32nd, 64th, 96th and 128th memory locations in memory bank B−1 are programmed to skip these associated memory locations in memory bank B−1. Thus, as noted in Table A, each of the 3 (B=3) memory banks 10, 12, 14 has 44 memory locations whereby 3 memory banks × 44 memory locations per memory bank = 132 memory locations.

Each of memory banks 10, 12 have 44 addressable memory locations while memory bank 14 has 40 addressable locations providing 128 addressable memory locations in the memory system of memory banks 10, 12, 14.

Having discussed the generation and format of Table A (and inferentially Table B) and, accordingly, the construction and format of the data stored in Q ROMb and Q ROMa, a more general discussion of the operation of the system of FIG. 1 utilizing the timing diagram of FIG. 2 will now be provided. Initially, it may be assumed that any one or more of the requestors 16, 18, 20 may be coupling their particularly associated memory address words to their associated memory address registers 36, 38, 40, respectively. However, for purposes of the present discussion, let us assume that only requestor 16 is coupling its memory address word to its respectively associated memory address register 36. Using the data of Table A for an exemplary discussion, requestor 16 is coupling a 7 bit memory address word to memory address register 36 wherein such 7 bit memory address word is broken down into two portions: a first portion G comprised of the two higher order bits; and, a second portion H comprised of the five lower order bits. As discussed herein above, this permits Q ROMb to consist of four addresses each of 6 bits in length because as indicated in Table A, Q ROMb consists of only four distinct data words. Likewise, inspection of the data words stored in the address portion of Q ROMa, indicates that Q ROMa may consist of 32 addresses each of four bits in length. Additionally, it can be seen that Bank R of Q ROMa consists of 32 addresses each of 3 bits in length. This coupling of the memory address word by requestor 16 to memory address register 36 and thence to its respectively associated ROM 22 is represented by timing signal 70 of FIG. 2. Subsequently, as at time $t_O$, requestor 16 couples its respectively associated Port O Request signal to its respectively associated controller 37 whereby the respectively associated ROM enable signal is to be generated. This coupling of Port O Request signal to controller 37 is represented by timing signal 72 of FIG. 2.

After a suitable delay time, as at time $t_1$, both Q ROMb and Q ROMa have decoded the memory address word coupled by requestor 16 to ROM 22. This is represented by timing signals 74 and 76 of FIG. 2. Next, as at time $t_2$, controller 37 couples a ROM Enable signal, as represented by ROM Enable signal 78 of FIG. 2, to ROM 22. ROM Enable signal 78, at time $t_2$, enables Q ROMb and Q ROMa to couple their selected address portions to adder 48 via their respectively associated output lines 42 and 43, while, concurrently, Q ROMa couples its selected Bank R signal, via cable 23, to priority networks 28, 30, 32. The coupling of the address portions of Q ROMb and Q ROMa to adder 48 and the coupling of the Priority Enable signal to priority networks 28, 30, or 32 are as represented by timing signals 80 and 82 of FIG. 2.

For purposes of the present discussion, assume that the memory address word that is coupled by requestor 16 to ROM 22 is

0011100

Accordingly, Q ROMa Bank R portion, as noted in Table A, is

010 indicating that priority network 30 is to be enabled and that memory bank 12 is to be selected and addressed by requestor 16.

Next, as at time $t_3$, adder 48 couples the bank address

001001 as the encoded sum of Q ROMb address portion

000000 and Q ROMa address portion

1001 both as illustrated in the above selected memory address of ROM 22, to address multiplexer 34 via cable 51.

Next, as at time $t_4$, the one enabled priority network 30 couples its respectively associated Priority Encoded Enable signal, represented by timing signal 86, to multiplexer 34 via cable 31.

Next, as at time $t_5$, address multiplexer 34 couples the 6-bit bank address

001001 represented by timing signal 88, to memory bank 12 via address multiplexer output cable 56.

Next, as at time $t_6$, priority network 30 couples a Memory Initiate signal, represented by timing signal 90, to memory bank 12 via its output line 59 whereby the data word stored in bank address

001001 of memory bank 12 is read out on its data out cable 13.

Although the above discussion of the operation of the embodiment of FIG. 1 utilized only one active requestor 16 and the configuration of ROM 22, as noted in Table B, it is to be appreciated that the configuration of ROM 22 as noted in Table B would be equally applicable while one or all of the N requestors could also be active. Because each of the B memory banks 10, 12, 14 has an associated priority network 28, 30, 32 and because each of the N requestors 16, 18, 20 has its own memory address translation system of ROM 22/adder 48, ROM 24/adder 50, ROM 24/adder 52, it can be seen that each of the N requestors may simultaneously request and have access to separate ones of the B memory banks, where $B \leq N$. This is so, as each of the priority networks determines priority between simultaneous requests, and as each requestor could request access to a different memory bank, all requestors could simultaneously have access to separate memory banks of memory system 8.

In conclusion, it can be seen that the above specification and drawings illustrate a novel method of and a system for addressing a multibank memory system that substantially precludes the probability of an excessive memory stacking condition.

What is claimed is:

1. A method of addressing a multibank memory system, comprising the steps of:
    forming a memory system of a plurality of B memory banks, each having the same plurality of memory locations with data words stored therein and a priority network;
    forming a memory address translation system of a plurality of N ROM's each of said N ROM's including addressing means;
    forming the data words stored in the memory locations in each of said ROM's of an address portion Qa that is representative of a requested memory address and a requested one of said B memory banks and of a bank R portion that specifies the one of the B memory banks in which the requested memory address is to have access, said Bank R portion comprised of B bits, wherein B is not a power of 2, i.e., $B = 2^X$ where X is a positive integer, only one of which is active for initiating and selecting only one of said B memory banks;
    coupling requested memory addresses to the addressing means from a memory requesting means of the selected ROM's;
    coupling the address portion Qa from each of said addressed ROM's to an address multiplexer;
    individually coupling one of the B bits of the bank R portion of each of said addressed ROM's to the priority network included in each of said plurality of B memory banks;
    simultaneously generating in each of said priority networks, from said Bank R portion, a priority enable code and a memory initiate signal when said priority network has been activated by an active one of the B bits of a Bank R portion; and
    coupling the priority enable code from each of said activated priority networks to said address multiplexer for coupling the prioritized one of said address portions Qa to the selected one of said B memory banks which has been initiated by said memory initiate signal for addressing the addressed one of said memory locations in said selected one of said B memory banks.

2. The method of claim 1 wherein $B \leq N$.

3. The method of claim 1 wherein B is a prime integer.

4. A method of addressing a multibank memory system, comprising the steps of:
  forming a memory system of a plurality of B memory banks, each having the same plurality of memory locations and a priority network;
  forming a memory address translation system of a plurality of N ROM's each of which has an addressing means and an adder means of a Q ROMa and a Q ROMb;
  forming the data words stored in the memory locations in each of said Q ROMb's of an address portion Qb that specifies a requested memory address in a requested one of said B memory banks;
  forming the data words stored in the memory locations in each of said Q ROMa's of an address portion Qa that specifies a requested memory address in a requested one of said B memory banks and of a Bank R portion that specifies the one of the B memory banks in which the requested memory address is to have access, said Bank R portion comprised of B bits, only one of which B bits is active for selectively activating only one of said B memory banks;
  coupling a request memory address to the addressing means of the selected one of said N ROM's from a memory requesting means;
  coupling the address portions Qb and Qa of the addressed ROM to the adder means;
  performing the sum Qb+Qa in said adder means;
  coupling the sum Qb+Qa from said adder means to an address multiplexer;
  coupling each B bit of the Bank R portion of said addressed ROM to one of said priority networks;
  simultaneously generating in each of said priority networks from said Bank R portion, a priority enable code and a memory initiate signal when said priority network has been activated by an active one of said Bank R portion; and,
  coupling the priority enable code from said activated priority network to said address multiplexer for coupling the prioritized Qb+Qa sum to the selected one of said B memory banks which has been initiated by said memory initiate signal for addressing the addressed one of said memory locations in said selected one of said B memory banks.

5. The method of claim 4 in which B is a prime integer.

6. The method of claim 4 in whch B is not a power of two, i.e., $B \neq 2^X$ where X is a positive integer.

7. A method of addressing a multibank memory system, comprising:
  forming a memory system of a plurality of B memory banks, each having the same plurality of memory locations and a priority network;
  forming a memory address translation system of a plurality of N ROM's, each having an adder network and an addressing means;
  forming each of said N ROM's of a Q ROMa and a Q ROMb;
  forming the data words stored in the memory locations in each of said Q ROMb's of an address portion Qb that is representative of a requested memory address in a requested one of said B memory banks;
  forming the data words stored in the memory locations in each of said Q ROMa's of an address portion Qa that is representative of a requested memory address in a requested one of said B memory banks and of a bank R portion that specifies the one of the B memory banks in which the requested memory address is to have access, said Bank R portion comprised of B bits, only one of which B bits is active or initiating and selecting only one of said B memory banks;
  addressing one or more of said ROM's by coupling memory address words to their respective addressing means from a memory requesting means;
  coupling the address portions Qb and Qa of the addressed ROM's to their respective adder networks;
  performing the sum Qb and Qa in each of said adder networks;
  coupling the sum Qb and Qa from said adder networks to an address multiplexer;
  coupling each B bit of the Bank R portion of each of said addressed ROM's to a corresponding one of said priority networks;
  simultaneously generating in each of the priority networks, from said Bank R portion, a priority enable code and a memory initiate signal when the priority network has been activated by an active one of the Bank R portion B bits; and,
  coupling the priority enable codes from said activated priority networks to said address multiplexer for coupling each prioritized one of said Qb+Qa sums to the selected one of said B memory banks which has been initiated by said memory initiate signal for addressing the selected one of said memory locations in said selected one of said B memory banks.

8. The method of claim 7 wherein $B \leq N$.

9. The method of claim 7 wherein B is not a power of 2, it, $B \neq 2^X$, where X is a positive integer.

10. The method of claim 9 wherein B is a prime integer.

11. A system for addressing a multibank memory system, comprising:
  a memory system comprised of a plurality of B memory banks, each having the same plurality of memory locations and a priority network;
  a plurality of N memory address translation systems each having a ROM and an adder network;
  each of said N ROM's comprised of a Q ROMa and a Q ROMb;
  each of said Q ROMb's having stored in its memory locations an address portion Qb that is representative of a requested memory address in a requested one of said B memory banks;
  each of said Q ROMa's having stored in its memory location an address portion Qa that is representative of a requested memory address in a requested one of said B memory banks and a Bank R portion that specifies the one of the B memory banks in which the requested memory address is to have access, said Bank R portion comprised of B bits, only one of which B bits is active for initiating and selecting only one of said B memory banks;
  means for coupling memory address words from a memory requesting means to one or more of said ROM's including further means for coupling the address portion Qb and Qa of each of the selected ROM's to its adder portion network;

address multiplexer means;

means for coupling the sums Qb+Qa from said adder networks to said address multiplexer means;

means for coupling each of the B bits of each of Bank R portions of each of said Q ROMa's to the corresponding one of said priority networks;

each of said priority networks simultaneously generating a priority enable code and a memory initiate signal when the priority network has had coupled thereto an active one of said Bank R portion B bits; and, means for coupling the priority enable code from each of said activated priority networks to said address multiplexer means for coupling each prioritized one of said Qb+Qa sums to the selected one of said B memory banks which has been initiated by said memory initiate signal for addressing the selected one of said memory locations in the selected one of said B memory banks.

* * * * *